United States Patent [19]

Gies et al.

[11] 4,224,024
[45] Sep. 23, 1980

[54] PROCESS FOR THE REACTIVE DYEING AND PRINTING OF FIBROUS MATERIALS CONTAINING HYDROXY GROUPS WITH A WATER-SOLUBLE ORGANIC DYESTUFF CONTAINING AT LEAST ONE PHOSPHONIC ACID-MONOFLUORIDE GROUP AND AT LEAST ONE IONIC WATER-SOLUBILIZING GROUP

[75] Inventors: Helmut Gies, Hofheim; Fritz Meininger, Frankfurt am Main, both of Fed. Rep. of Germany

[73] Assignee: Hoechst Aktiengesellschaft, Frankfurt, Fed. Rep. of Germany

[21] Appl. No.: 611,881

[22] Filed: Sep. 10, 1975

[30] Foreign Application Priority Data

Oct. 26, 1974 [DE] Fed. Rep. of Germany ....... 2451005

[51] Int. Cl.² ....................... D06P 1/06; D06P 1/384; D06P 3/66; D06P 1/10
[52] U.S. Cl. .................. 8/445; 8/584; 8/566; 260/148; 260/151; 260/153; 260/163; 260/176; 260/185; 260/193; 260/197; 260/199; 260/200; 260/201; 260/314.5; 260/371; 260/374; 544/82; 544/189
[58] Field of Search ..................... 8/41 R, 41 A, 41 B, 8/41 C, 1 G, 1 E, 42 R, 42 A, 42 B, 42 C; 260/199, 200, 198, 371, 374, 201, 314.5, 163, 185, 193, 198, 148, 149, 151, 147, 176, 153; 544/82, 189

[56] References Cited

U.S. PATENT DOCUMENTS

| | | | |
|---|---|---|---|
| 2,200,543 | 5/1940 | Dickey et al. | 260/205 |
| 2,215,637 | 9/1940 | Dickey | 260/186 |
| 2,328,570 | 9/1943 | McNally et al. | 260/196 |
| 2,596,660 | 5/1952 | Dickey | 260/502.5 |
| 2,799,701 | 7/1957 | Whitehouse et al. | 260/502.5 |
| 2,959,582 | 11/1960 | Schimmelschmidt et al. | 260/163 |

OTHER PUBLICATIONS

Farbwerke, Chemical Abstracts, vol. 55, 7880d (1961).
Swidler, et al., Chemical Abstracts, vol. 80, #1347986b (1974).
Grossman, et al., Chemical Abstracts, vol. 64, 9857d (1966).

*Primary Examiner*—Floyd D. Higel
*Attorney, Agent, or Firm*—Curtis, Morris & Safford

[57] ABSTRACT

The invention is in a process for dyeing and printing fibrous materials containing hydroxy groups, in particular materials such as cotton, linen, hemp, regenerated cellulose and mixtures of these fibers together with polyester or polyamide fibers. The invention is based on the discovery that water-soluble organic dyestuffs containing at least one phosphonic acid mono-fluoride group corresponding in the acid form to the formula

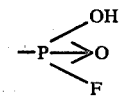

and containing at least one ionic water-solubilizing group, can be fixed reactively to the fibrous material containing hydroxy groups under alkaline conditions.

The dyeings and prints obtained by the process of the invention have a very even shade and are obtained in high intensity and color depth. They are fast to light and alkali and are distinguished by a very high fastness to washing, even in the alkaline range and at elevated temperatures.

7 Claims, No Drawings

PROCESS FOR THE REACTIVE DYEING AND PRINTING OF FIBROUS MATERIALS CONTAINING HYDROXY GROUPS WITH A WATER-SOLUBLE ORGANIC DYESTUFF CONTAINING AT LEAST ONE PHOSPHONIC ACID-MONOFLUORIDE GROUP AND AT LEAST ONE IONIC WATER-SOLUBILIZING GROUP

The present invention relates to a process for the reactive dyeing and printing of fibrous materials containing hydroxy groups.

Reactive dyestuffs must have a functional group capable of forming a covalent bond with the fiber. Beside the great number of fiber-reactive groups which contain a carbon atom as reactive center, groups containing sulfonic acid fluoride radicals are also known. Water-soluble azo dyestuffs which contain as reactive group a sulfonic acid fluoride radical are fixed on the fiber in such a way that the application of the dyestuff to the fibrous material to be dyed reactively is accompanied by the treatment with an acid-binding agent and, if desired, the dyestuff is treated with heat. Reactive dyestuffs of this type do not have any practical importance because the cellulose materials dyed reactively with these dye-stuffs only display a poor stability towards intense washings.

It is also known that organic dyestuffs containing water-soluble phosphonic acid groups are used as fiber-reactive dyestuffs which are fixed by applying the dyestuff and a carbodiimide from an acid dye-bath to the fibrous material to be dyed reactively and fixing the dyestuff on the substrate by heating preferably to 160° C.

However, due to the fact that the phosphonic acid group has an only weak reactivity in respect to the hydroxy groups of the fibrous material and the process can only be effected in the acid pH range, the dyeing and printing processes that are of technical importance for conventional reactive dyestuffs cannot be considered for reactive dyestuffs containing phosphonic acid groups, which is a drawback. So, a reasonable combination on a technical scale with usual reactive dyestuffs capable of being fixed in an alkaline medium is excluded and the application is limited to heat setting processes, drawbacks that are obstructive to the introduction of dyestuffs containing phosphonic acid groups for the reactive dyeing of cellulose fibrous materials.

It was, therefore, desirable to find a process for the reactive dyeing of fibrous material containing hydroxy groups which can be applied in a wider pH range, i.e. in the alkaline as well as in the acid range.

The present invention provides a process for dyeing and printing fibrous material containing hydroxy groups which process allows the application in the alkaline range and, optionally, in the acid pH range a new reactive dyestuffs that are described hereinafter.

The present invention is based on the surprising fact, that water-soluble organic dyestuffs containing at least one phosphonic acid mono-fluoride group which corresponds in the acid form to the formula

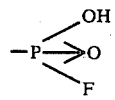

and, preferably, at least a ionic water-solubilizing group, can be fixed reactively in the alkaline or acid range on the fibrous material containing hydroxy groups.

The present invention especially relates to a process for the reactive dyeing and printing of fibrous materials containing hydroxy groups which comprises applying one or several dyestuffs which contain at least one phosphonic acid mono-fluoride group and, preferably, at least one water-solubilizing group, to the fibrous material in the form of a dyestuff solution or a printing paste and fixing the dyestuffs at a temperature ranging from 10° to 230° C., preferably 60° to 210° C., especially 100° to 180° C., by means of an acid-binding agent at a pH of from 7.5 to 12, preferably 7.5 to 10, or in the presence of an acid agent and a carbodiimide, for example cyanamide or dicyanamide, at a pH of from 1 to 6, preferably 3 to 6, or treating the fibrous materials in a dyebath that contains one or several of these dyestuffs and one or several acid-binding agents, at a pH of from 7.5 to 12, preferably 7.5 to 10, and at a temperature ranging from 40° to 120° C., preferably 60° to 100° C.

A further inventive item of this invention are the said water-soluble dyestuffs which contain at least one phosphonic acid monofluoride group and preferably at least one ionic water-solubilizing group, for example a sulfo group. There are especially to mention dyestuffs which correspond in the free acid form to the formula

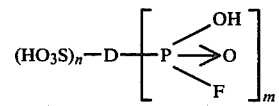

wherein D is the radical of an organic dyestuff, m is 1, 2 or 3 and n is 1, 2, 3, 4, 5 or 6.

Dyestuffs according to the invention wherein D is a radical selected from the group of the azo dyestuffs, polyazo dyestuffs, especially disazo dyestuffs, metal-containg azo dyestuffs, metal-containing phthalocyanine dyestuffs, anthraquinone dyestuffs or dioxazine dyestuffs are preferred.

The new dyestuffs which are suitable for the process of the invention, belong to the various classes. For example, triarylmethane, naphthoquinone, benzanthrone, azine, dioxazine, nitro, stilbene or formazane dyestuffs, especially phthalocyanine dyestuffs, anthraquinone and metal-free or metal-containing mono or polyazo dyestuffs can be used that contain at least one phosphonic acid mono-fluoride group and, preferably further water-solubilizing groups, such as carboxylic acid groups, especially sulfonic acid groups.

The use of the dyestuffs selected from the group of the azo dyestuffs, the polyazodyestuffs, especially the diasazo dyestuffs, metal-containing azo dyestuffs, metal-containing phthalocyanine dyestuffs, anthraquinone dyestuffs and dioxazine dyestuffs is preferred Dyestuffs which can be used in accordance with the invention are, for example the fluorides of the phosphonic acid dyestuffs described in German Pat. No. 1,042,523, in Swiss Pat. No. 394,442, in U.S. Pat. Nos. 2,596,660 and 2,799,701 and in German Offenlegungsschrift No. 2,324,809.

In the process of the invention, the dyestuffs preferably used are those which do not contain any other reactive group than the phosphonic acid mono-fluoride group.

The process of the invention serves for the preparation of dyeings on fibrous materials containing hydroxy groups of every type. Those fibrous materials are, for example the natural cellulose fibers, such as cotton, linen, hemp and regenerated cellulose. The process of the invention serves likewise for the dyeing of fibers containing hydroxy groups which are contained in mixed fabrics, for example mixtures of cotton with polyester fibers or polyamide fibers.

The dyestuffs of the invention can be applied to the fibrous material and fixed on the fiber in different manner, especially in the form of dyestuff solutions and printing pastes.

The dyeing liquors and printing pastes, whether containing acid-binding or acid-yielding agents or acids and/or a carbodiimide may contain the generally usual additives. The solutions may contain, for example inorganic salts, such as alkali metal chlorides or alkali metal sulfates, urea, alginate thickenings, water-soluble cellulose alkyl ethers and dispersing and levelling agents, the printing pastes may contain, for example urea, sodium, m-nitrobenzene sulfonate and the usual thickening agents, such as methyl cellulose, starch ether, emulsion thickenings or, preferably, alginate, for example sodium alginate.

The dyeing baths and printing pastes containing the dyestuff, the acid-binding agent or the acid agent and the carbodiimide can be applied to the material to be dyed within a wide temperature range, preferably at room temperature (15° to 30° C.) or at temperatures up to 60° C. For this purpose, dyeing is carried out in advantageous manner so that the fibrous material is impregnated with the dyeing liquors that optionally contain neutral salts, then squeezed off, then padded, for example in the usual way, and subjected to a heat treatment to fix the dyestuff, optionally after intermediate drying. In a similar manner, prints are produced by printing the fibrous material with the printing pastes mentioned, drying intermediately and subjecting the printed and dried material to a heat treatment to fix the dyestuffs. Depending on the concentration and the type of the acid-binding agent, the dyestuffs can also be fixed for example at 20°–60° C., by allowing the impregnated or printed moist fibrous material to dwell several hours at room temperature or at elevated temperature.

The dyeings and prints can be fixed in the alkaline or acid range by a heat treatment according to various methods usual in technique, for example by steaming with saturated steam at about 100° to 130° C. or with over-heated steam at temperatures up to 150° C., with hot air at 120° to 230° C. (thermofixation), by infrared irradiation, by allowing the material to pass through hot, aqueous solutions having a high salt content, through hot steams of inert, organic solvents or by leading the padded or printed web over a series of heated rollers.

To perform the process according to the invention in the alkaline pH-range, the acid-binding agents used are for example sodium hydroxide, potassium hydroxide, or an alkali metal salt of a weak acid, for example sodium carbonate or bicarbonate, trisodium phosphate, disodium phosphate, sodium metasilicate or the sodium salt of the trichloroacetic acid, as well as ammonia or sufficiently basic organic amines, such as diethyl amine, diisopropyl amine, cyclohexyl amine and triethyl amine or mixtures of these acid-binding agents.

To perform the process according to the invention in the acid pH-range the acid-yielding agent and the acids preferably used are those which are not volatile at the fixing temperature and which do not cause the disintegration of the fibrous material to a greater than permissible extent, for example a phosphoric acid, a low molecular weight alkyl phosphoric acid or chloroacetic acid.

The acid-binding agent or the acid-yielding agent or the acids and the carbodiimide can, however, also be applied to the fibrous material before or after the application of the dyeing liquors or printing pastes which do not contain these agents, for example by spraying or padding an aqueous solution of the agent. The solution of these agents can also contain generally usual additives, for example the ones described above. When these agents are applied to the material to be dyed at the same time as the dyestuff, it is advantageous to dissolve them in the dyebath or in the printing paste containing the dyestuff.

When practically neutral dyeing liquors or printing pastes are used that do not contain acid or alkaline agents, the dyestuffs are fixed advantageously by introducing the dyed material into a salt-containing bath containing the acid-binding or acid-yielding agent, and subjecting it, after squeezing off and optionally after intermediate drying, to a heat treatment.

When the process of the invention is carried out according to the direct dyeing method (exhaustion method), the alkaline pH range is advantageously chosen. The dyebath contains one or several of the above acid-binding agents and the optionally usual additives, such as inorganic salts, urea and others of the above-mentioned auxiliaries.

The dyeings and prints obtained have a very even shade and can be obtained with high intensity and color depth; they are fast to light and alkali and are distinguished by a very high fastness to washing, even in the alkaline range and at 85° C.

The dyestuffs are considerably stable in printing pastes and still yield prints of practically unaltered shades after a long storage of those pastes.

The new dyestuffs according to the invention can be synthesized according to various methods, for example using the corresponding aryl amines as starting compounds, such as those derived from amino-aryl-phosphonic acid monofluorides, via diazotization and coupling reactions or condensation reactions, generally known for the preparation of analogous known dyestuffs that do not contain the phosphonic acid monofluoride group (cf. German Pat. No. 1,235,466).

Compared to the known process as described in German Pat. No. 2,324,809, the process of the invention has the advantage that it can be carried out in the acid and in the alkaline range and brings about good coloristical results in both pH ranges. Moreover, the new dyestuffs applied according to the process of the invention can be fixed under considerably milder and fiber-protecting conditions on the fibrous materials containing hydroxy groups; already at fixing temperatures of 100° C., they yield plain dyeings and prints, partially even at temperatures of about 60° C. or lower, preferably in the alkaline pH range. Moreover, they can be applied to and fixed on the fiber not just according to a few and only determined processes, but the whole technical scale of dyeing and printing methods so far known in technique can be applied in the process of the invention.

The following Examples illustrate the invention; the parts are by weight. Parts by weight and parts by volume are as grams to cubic centimeters.

EXAMPLE 1

(a) 20 Parts of a dyestuff, as free acid corresponding to the formula

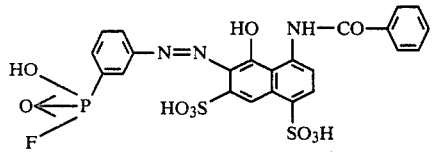

were dissolved with 50 parts of urea in 200 parts of water while heating. 400 Parts of a thickening of 40 parts of sodium alginate and 960 parts of water and 15 parts of sodium carbonate were added to this solution while stirring. Then, the paste was made up with water and thickening to 1000 parts.

A cotton textile material was printed with this printing paste, then dried and steamed for 5 minutes at 101° to 103° C., then rinsed with cold and hot water, soaped while boiling, again rinsed with water and dried.

An intense brilliant red print of good fastness to light was obtained that was excellently stable against heavy washings also in the alkaline range.

(b) The dyestuff used in this process can be prepared as follows: 174 parts of 3-aminophenyl-phosphonic acid monofluoride were diazotized in the usual manner in dilute hydrochloric acid with sodium nitrite under cooling. A neutralized solution of 423 parts of 1-benzoylamino-8-hydroxynaphthalene-4,6-disulfonic acid was introduced into this diazonium solution within 1 hour at 0° to 5° C. The pH was adjusted to 9–10 with dilute sodium hydroxide solution, whereupon coupling occurred. The reaction mixture was stirred for several hours at pH 8, which causes the dyestuff to precipitate partially. The precipitation of the monoazo dyestuff obtained was completed by introducing potassium chloride. It was filtered off, washed with aqueous potassium chloride solution and dried at 40°–50° C. under reduced pressure. The dyestuff powder obtained was dissolved in water yielding an intense red color.

EXAMPLE 2

The printing paste prepared according to Example 1(a) was used to print a cotton fabric that was dried and cut into different samples. To fix the dyestuff, the samples of the fabric were heated with hot air to different temperatures for 3 to 5 minutes, the temperatures being 120° C., 140° C. and 180° C., and another fraction of the samples to 200° C. for 30 seconds. The samples were rinsed with cold and hot water, soaped while boiling and dried. The brilliant red prints that have an excellent fastness to washing, show a good conformity to color intensity and tinctorial strength, independently of the fixing conditions chosen.

EXAMPLE 3

20 Parts of a dyestuff, corresponding as free acid to the formula

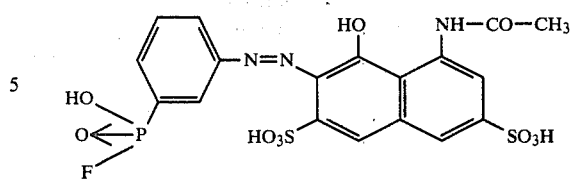

(obtained by coupling diazotized 3-amino-phenyl-phosphonic acid monofluoride with 1-acetylamino-8-hydroxy-naphthalene-3,6-disulfonic acid) were used to prepare a printing paste according to Example 1. This printing paste was used to print a cotton fabric immediately, and further samples after a 3 days', 6 days' and 11 days' storage of the printing paste at 25° C.

The cotton prints so prepared were dried each at 60° C., steamed for 5 minutes at 101°–103° C., rinsed with cold and hot water and dried. The color intensities of the individual prints are practically identical.

The Example shows that the printing paste containing an acid-binding agent is stable over a prolonged period of time.

EXAMPLE 4 (comparison example)

20 Parts of the phosphonic acid dyestuff, corresponding as free acid to the following formula

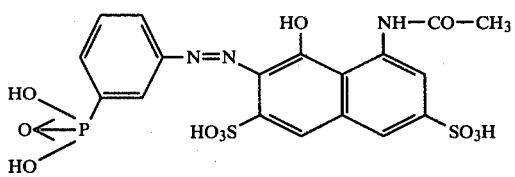

(prepared by coupling diazotized 3-aminophenyl-phosphonic acid with 1-acetylamino-8-hydroxy-naphthalene-3,6-disulfonic acid) were dissolved with 50 parts of urea in 200 parts of hot water. To the solution having an intense red color, 400 parts of a thickening consisting of 40 parts of sodium alginate and 930 parts of water and 30 parts of sodium bicarbonate were added while stirring. The paste was then made up to 1000 parts with water and thickening.

The printing paste was printed on a cotton fabric, that was steamed after drying during 5 minutes at 101°–103° C., rinsed with cold and hot water, soaped while boiling, rinsed again and dried. The cotton fabric so obtained was practically colorless.

Also, if samples of that printed cotton fabric were heated instead of steamed each time for 5 and 10 minutes at 140° C., at 160° C. and at 180° C., practically the whole dyeing disappeared after washing.

The Example shows that the known dyestuff which contains the phosphonic acid group, is not fixed on the fibrous material by the action of heat in the presence of an acid-binding agent.

EXAMPLE 5

A dyeing liquor was prepared which contained in 250 parts by volume of water 15 parts of the dyestuff mentioned in Example 1 and 15 parts of cyanamide. This dyeing liquor, adjusted to pH 1.5 whith phosphoric acid, was used to pad a cotton fabric, the fabric was squeezed off to a liquor pick-up of 80% and drid for 5 minutes at 65° C. in the drying cabinet. The dyed and dried cotton fabric was cut into several samples that were subjected each for 5 minutes at 80° C., at 100° C., at 130° C. and at 180° C. to the action of heat, rinsed with cold and hot water, soaped while boiling, rinsed again and dried.

The fabric sample dried at 65° C. showed a brilliant red dyeing of medium intensity, the other ones showed dyeings of an intense brilliant red.

EXAMPLE 6 (comparison example)

When the dyestuff used in Example 5 is replaced therein by the phosphonic acid dyestuff of the same constitution of the formula

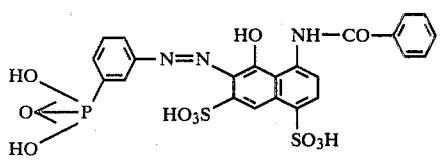

and the process is performed as in Example 5, the sample dried at 65° C. was practically colorless and that heated to 200° C. showed a comparatively poor coloring.

The Example shows that a dyestuff containing a phosphonic acid-monofluoride group can also be used in the acid pH range for the reactive dyeing of cellulose textile materials and that the dyestuff of the invention has a better reactive power with regard to cellulose than the comparison dyestuff.

EXAMPLE 7

A dyebath was prepared that contained in 250 parts by volume of water 15 parts of the dyestuff used in Example 1, 15 parts of cyanamide and such an amount of phosphoric acid that the bath showed pH 2. A cotton fabric was padded with the liquor, squeezed to a liquor pick-up of about 80% and dried for 5 minutes at 60° C., fixed for 5 minutes with hot air of 180° C., rinsed with cold and hot water, soaped while boiling, again rinsed with water and dried.

An intense brilliant red dyeing was obtained that had a very good fastness to wetting and a very high fixing quote of the dyestuff.

When cyanamide is replaced by the same amount by weight of dicyanamide and the dyed and dried fabric is treated with hot air during 5 minutes at 140° C., a similar good coloristical result was obtained.

EXAMPLE 8

20 Parts of a dyestuff, corresponding as free acid to the formula

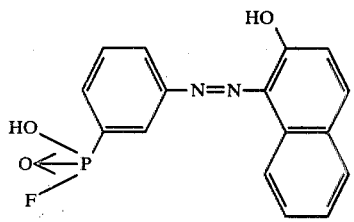

(obtainable by coupling diazotized 3-amino-phenyl-phosphonic acid-monofluoride with 2-naphthol), were dissolved in a mixture of 50 parts of urea, 200 parts of hot water and 400 parts of a sodium alginate thickening. To the paste, 15 parts of sodium bicarbonate were added while stirring and made up to 1000 parts with water and thickening.

This printing paste was used to print a cotton fabric that was steamed after drying for 5 minutes at 101°–103° C. and finished as usual.

A brilliant orange print was obtained that is extremely stable towards washings.

EXAMPLE 9

25 Parts of mercerized cotton were dyed for 45 minutes at 60° C. in a dyebath consisting of 500 parts by volume of water, 40 parts of sodium sulfate, 10 parts of sodium carbonate and 1.25 parts of the dyestuff used in Example 8. The dyed fabric was first rinsed in a bath containing acetic acid, then with boiling water and dried. A fast, orange dyeing was obtained.

When instead of 10 parts of sodium carbonate only 5 parts of sodium carbonate or 5 parts of tertiary sodium phosphate were used, a similar good coloristical result was obtained.

EXAMPLE 10

(a) 20 Parts of the dyestuff, corresponding in the form of the free acid to the formula

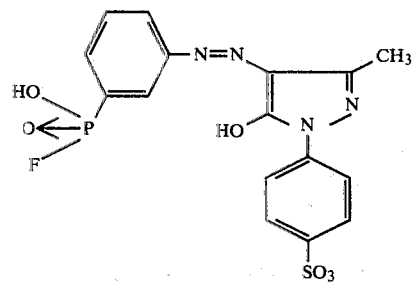

were dissolved with 50 parts of urea in 200 parts of hot water. 400 parts of an aqueous starch-ether thickening of 10% by weight and 40 parts of the sodium salt of trichloroacetic acid were added. The paste obtained was made up to 1,000 parts by admixing water and thickening.

When natural cellulose materials were printed with this dyestuff paste, such as cotton or cellulose regenerated fibers, the prints were fixed in an analogous manner as described in Example 1 and finished, intense yellow prints were obtained.

To illustrate the excellent stability of the linkage between dyestuff and fiber in the alkaline range, samples of the yellow cotton print were treated with 1 N sodium hydroxide solution and with 1 N sodium carbonate solution each 1 hour at boiling temperature. The dyestuff was peeled off from the the fiber only in traces, the accompanying pure cotton fabric remained colorless.

(b) The dyestuff used in this process can be prepared as follows: Into a diazonium salt solution, prepared as in Example 1(b) from 174 parts of 3-aminophenyl-phosphonic acid-monofluoride 254 parts of 1-(4'-sulfo-phenyl)-3-methyl-pyrazolone-(5) were added in small portions; a dilute sodium carbonate solution was introduced while cooling until pH 6 was reached. This pH was maintained until coupling had been completed. The monoazo dyestuff obtained was salted out with potassium chloride, filtered off, washed with a dilute potassium chloride solution and dried under reduced pressure at 40° C. to 50° C. It is in the form of a yellow powder that can readily be dissolved in water yielding a yellow color.

EXAMPLE 11 (Comparison example)

20 Parts of the phosphonic acid dyestuff, corresponding as free acid to the formula

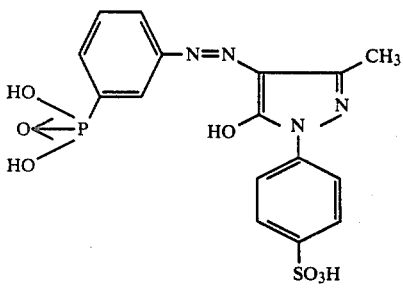

that was prepared by coupling diazotized 3-amino-phenyl phosphonic acid with 1-(4'-sulfophenyl)-3-methyl-pyrazolone-(5), were used to prepare printing pastes according to Examples 1 or 10, which contain as acid-binding agents 30 parts of sodium bicarbonate, 30 parts of potassium fluoride, 30 parts of sodium acetate, 40 parts of the sodium salt of trichloroacetic acid, 20 parts of sodium carbonate or 20 parts of 33% sodium hydroxide solution.

These printing pastes were used to print cotton fabrics and they were fixed as indicated in Example 1 and finished. All yellow prints lost their color upon being washed.

The example shows that in the presence of acid-binding agents, even of strong alkalis, the fixation of the known dyestuff containing phosphonic acid groups on the fibrous material does not occur.

EXAMPLE 12

20 Parts of the dyestuff of the formula

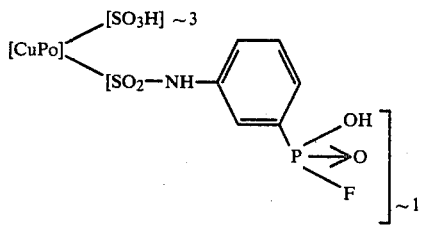

(obtainable by condensation of copper phthalocyanine tetrasulfochloride with 3-amino-phenyl-phosphonic acid-monofluoride; cf. analogous condensation reaction in German Pat. No. 1,235,466, Example 3) were used to prepare a printing paste as indicated in Example 1, that was printed on cotton and thermofixed. A turquoise print was obtained which was very fast to light and to washing.

EXAMPLE 13

A linen fabric was introduced into a dyebath that consisted of 2 parts of the dyestuff used in Example 12, 500 parts by volume of water, 40 parts of sodium sulfate and 10 parts of sodium carbonate. It was dyed for 1 hour at 60° to 65° C. Then, the material was rinsed in a bath containing acetic acid until it became neutral and dried. A level clear turquoise dyeing was obtained having good to very good fastness properties.

When instead of the dyestuff used as above 2 parts of nickel-phthalocyanine dyestuff of corresponding structure were used, a clear bluish-green coloring was obtained that was fixed on the fabric with fastness to light and to washing.

EXAMPLE 14

25 Parts of a cotton fabric were treated in a dyeing liquor that consisted of 10 parts of the dyestuff used in Example 12 and 500 parts by volume of water, for 10 minutes at 20°–25° C. and then squeezed to a liquor pick-up of about 80%. The dyed material was then treated with a solution of 25 parts of sodium chloride and 2 parts of sodium carbonate in 1,000 parts by volume of water at 20°–25° C., squeezed off and dried for 5 minutes at 65° C. To fix the dyestuff, the dyed material was steamed for 5 minutes at 101°–103° C. or heated at 140° C. for 3 minutes. Finally, the dyeing was finished as usual. In both cases, a completely level turquoise dyeing was obtained which was fast to light and to washing.

EXAMPLE 15

A dyebath was prepared from 1.25 parts of the dyestuff used in Example 8, 500 parts by volume of water and 40 parts of sodium sulfate and adjusted to pH 10.8 with aqueous ammonia. In this dyeing liquor, 25 parts of a cotton fabric were dyed for 1 hour at 60° C. The alkalinity of the dyebath fell to pH 10.2, the dyebath was drawn off, the material was rinsed with cold, then with boiling water, and finishing followed as usual.

A plain, level orange dyeing was obtained.

The same result was obtained when instead of aqueous ammonia an aliphatic or cycloaliphatic amine, such as diisopropyl amine or cyclohexyl amine was used.

EXAMPLE 16

15 Parts of the dyestuff used in Example 1 were dissolved in 250 parts by volume of water at pH 7; to the dyestuff solution, 30 parts of urea were added. Cotton poplin was treated for 10 minutes at 25° C. with this dyebath, squeezed to a liquor pick-up of 80% by weight, dried for 5 minutes at 65° C. and allowed to stay in an ironing press for 15 minutes at 180° C. The dyed material was then rinsed with cold and hot water, soaped while boiling, again rinsed and dried.

A brilliant red dyeing was obtained which was very fast to heavy washing.

This Example shows that the dyestuffs of the invention can be fixed on the fibrous material also without the use of acid and condensation agents or acid-binding agents having an alkaline effect.

EXAMPLE 17

20 Parts of the dyestuff used in Example 10 and 30 parts of sodium sulfate were dissolved in 1000 parts by volume of water. To this solution, 28 parts by volume of a 33% by weight sodium hydroxide solution were added. In the dyebath so obtained a cotton fabric was impregnated at 20° C. Then, the material was squeezed to a liquor pick-up of about 80%, rolled on a roller, wrapped in a foil and left for about 10 hours at 18°–25° C. while turning the roller. The material was acidified, rinsed in boiling water and dried.

A clear yellow dyeing was obtained that was very fast to the action of light and to washing.

EXAMPLE 18

20 Parts of a dyestuff, corresponding as free acid to the formula

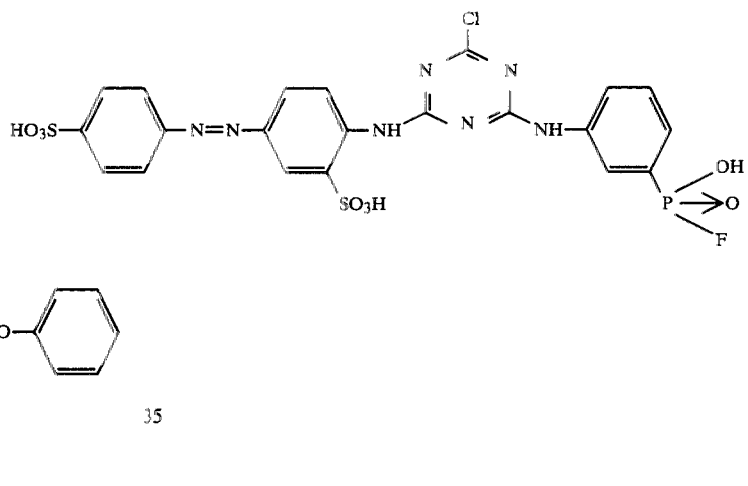

(prepared from the monoazo dyestuff described in Example 1 by oxidizing coppering) were dissolved with 50 parts of urea and 200 parts of water while heating. To the solution obtained, 400 parts of a thickening consisting of 40 parts of sodium alginate and 945 parts of water and 15 parts of sodium carbonate were added. The paste was made up to 1,000 parts by weight with water and thickening.

This printing paste was used to print a cotton fabric that was dried thereafter and steamed for 5 minutes at 101°–103° C., rinsed with cold and hot water, soaped, again rinsed with water and dried.

A red violet print was obtained that was very fast to light and to washing.

EXAMPLE 19

20 Parts of the dyestuff of the formula

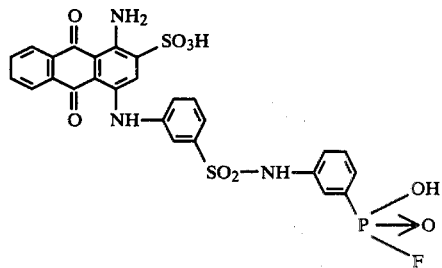

were used to prepare a printing paste as indicated in Example 1 which was printed on cotton, thermofixed and finished in the usual manner. A blue print was obtained that was very fast to light and to washing.

The dyestuff used in this process can be obtained by condensing 1-amino-4-(phenylamino-3'-sulfochloride)-anthraquinone-2-sulfonic acid with 3-amino-phenyl-phosphonic acid-monofluoride (cf. analogous condensation reaction in German Pat. No. 1,235,466, Example 4).

EXAMPLE 20

20 Parts of a dyestuff, corresponding in the form of the free acid to the formula were dissolved in a mixture consisting of 50 parts of urea, 200 parts of hot water and 400 parts of sodium alginate thickening. To the paste, 15 parts of sodium bicarbonate were added while stirring and filled up to 1,000 parts by weight with water and thickening.

This printing paste was used to print a cotton fabric, it was steamed after drying for 5 minutes at 101°–103° C. and finished as usual.

A yellow print was obtained that was very fast to washing.

The dyestuff used in this process was obtained by condensing 4-amino-1,1'-azobenzene-3,4'-disulfonic acid with cyanure chloride and following reaction of the condensation product with 3-aminophenyl-phosphonic acid-monofluoride. (cf. analogous condensation reaction in German Pat. No. 1,235,466, Example 8).

The m-aminophenyl-phosphonic acid-minofluoride used as starting compound could, for example be prepared by reducing 3-nitrophenyl-phosphonic acid-difluoride with iron powder in acetic acid medium.

EXAMPLES 21 to 35

In an analogous manner as described in the foregoing Examples the new dyestuffs indicated in the following Table yield dyeings and prints on cotton having very good fastness properties, especially an excellent fastness to washing.

TABLE

| Example | dyestuff used | shade on cotton |
|---|---|---|
| 21 | [1:2-chromium complex of bis-azo dye with naphthalene core bearing OH, NH₂, two SO₃H groups; one side 2-hydroxy-5-sulfophenylazo, other side 3-(fluorohydroxyphosphoryl)phenylazo] | olive green |
| 22 | [1:2-cobalt complex, analogous structure to Example 21] | greenish blue |
| 23 | [1,4-bis(arylamino)anthraquinone: one arylamino = 2-methyl-6-sulfophenyl; other = 4-methyl-2-(N-(3-(fluorohydroxyphosphoryl)phenyl)sulfamoyl)phenyl] | green |
| 24 | [3-(fluorohydroxyphosphoryl)phenylazo-1-hydroxy-2-naphthalenesulfonic acid derivative] | orange |
| 25 | [1-amino-2-sulfo-4-(arylamino)anthraquinone linked via biguanide with chloro-triazine and 3-(fluorohydroxyphosphoryl)aniline, with SO₃H on arylamino] | blue |
| 26 | [bis-acetoacetylamino-3,3'-dimethylbiphenyl bis-azo coupled with two 3-(fluorohydroxyphosphoryl)phenyl groups] | greenish yellow |
| 27 | [(fluorohydroxyphosphoryl)methyl-phenyl-azo-1-hydroxy-7-acetamido-3-sulfonaphthalene] | orange |
| 28 | [bis-(3-(fluorohydroxyphosphoryl)phenyl-aminosulfonyl) dioxazine with N-ethyl carbazole units, chloro substituents, (SO₃H)₂] | blue |

| Example | dyestuff used | shade on cotton |
|---|---|---|
| 29 | | green |
| 30 | | red |
| 31 | | greenish yellow |
| 32 | | scarlet |
| 33 | | yellow |
| 34 | | yellow |
| 35 | | dark blue or black |

We claim:

1. A process for the reactive dyeing or printing of a fibrous material containing hydroxy groups, which comprises reactively fixing on the material to be dyed at a pH of 7.5 to 12 a water-soluble organic dyestuff of the formula

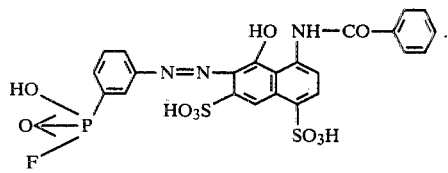

2. A process for the reactive dyeing or printing of a fibrous material containing hydroxy groups, which comprises reactively fixing on the material to be dyed at a pH of 7.5 to 12 a water-soluble organic dyestuff of the formula

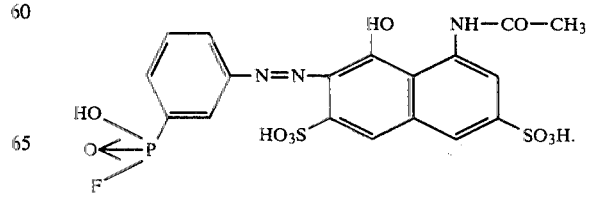

3. A process for the reactive dyeing or printing of a fibrous material containing hydroxy groups, which comprises reactively fixing on the material to be dyed at a pH of 7.5 to 12 a water-soluble organic dyestuff of the formula

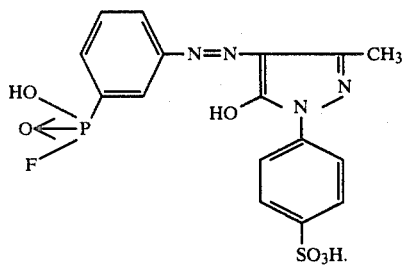

4. A process for the reactive dyeing or printing of a fibrous material containing hydroxy groups, which comprises reactively fixing on the material to be dyed at a pH of 7.5 to 12 a water-soluble organic dyestuff of the formula

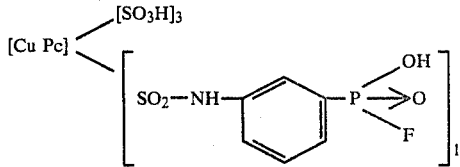

5. A process for the reactive dyeing or printing of a fibrous material containing hydroxy groups, which comprises reactively fixing on the material to be dyed at a pH of 7.5 to 12 a water-soluble organic dyestuff of the formula

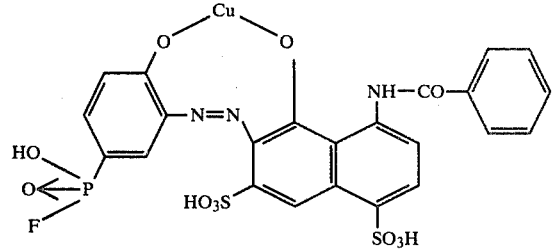

6. A fibrous material containing hydroxy groups which was dyed with a water-soluble organic dyestuff containing at least one phosphonic acid-monofluoride group and at least one ionic water-solubilizing group.

7. A fibrous material containing hydroxy groups which was printed with a water-soluble organic dyestuff containing at least one phosphonic acid-monofluoride group and at least one ionic water-solubilizing group.

* * * * *

Disclaimer 4,224,024.—*Helmut Gies,* Hofheim/Taunus and *Fritz Meininger,* Frankfurt/Main, Germany. PROCESS FOR THE REACTIVE DYEING AND PRINTING OF FIBROUS MATERIALS CONTAINING HYDROXY GROUPS WITH A WATER-SOLUBLE ORGANIC DYESTUFF CONTAINING AT LEAST ONE PHOSPHONIC ACID-MONOFLUORIDE GROUP AND AT LEAST ONE IONIC WATER-SOLUBILIZING GROUP. Patent dated Sept. 23, 1980. Disclaimer filed May 3, 1982, by the assignee, *Hoechst Aktiengesellschaft.*

Hereby enters this disclaimer to claims 6 and 7 of said patent.

[*Official Gazette June 29, 1982.*]